United States Patent [19]

Gowda et al.

[11] Patent Number: 4,694,213

[45] Date of Patent: Sep. 15, 1987

[54] FERROFLUID SEAL FOR A STATIONARY SHAFT AND A ROTATING HUB

[75] Inventors: Hanumaiah L. Gowda, Hudson; Charles J. Cheever, Nashua; Frank Bloom, Windham, all of N.H.

[73] Assignee: Ferrofluidics Corporation, Nashua, N.H.

[21] Appl. No.: 933,485

[22] Filed: Nov. 21, 1986

[51] Int. Cl.[4] .................. H02K 5/124; H01F 7/02; F16J 15/40; F16C 32/04

[52] U.S. Cl. .................. 310/90; 184/6.18; 310/90.5; 384/133; 415/175; 416/174

[58] Field of Search .................. 184/6.18, 6.27, 13.1; 277/80, 135, 67 R, 90, 90.5; 384/133, 135, 424, 446, 478; 415/175; 416/174

[56] References Cited

U.S. PATENT DOCUMENTS 4,565,379 1/1986 Ballhaus .................. 277/135
4,630,943 12/1986 Stahl et al. .................. 384/133

FOREIGN PATENT DOCUMENTS 226766 12/1984 Japan .................. 277/135
1121520 10/1984 U.S.S.R. .................. 310/90.5

Primary Examiner—Peter S. Wong
Assistant Examiner—D. L. Rebsch
Attorney, Agent, or Firm—Wolf, Greenfield & Sacks

[57] ABSTRACT

A ferrofluid seal for a bearing application with a stationary shaft about which a hub rotates. The seal consists of a permanent magnet and one or more annular pole pieces which form a magnetic circuit with the bearing shaft. The magnetic circuit includes an annular gap between the shaft and the pole pieces in which the magnetic flux traps a magnetic fluid which bridges the gap to form a seal. The shaft is tapered in the gap area to form a wedge-shaped gap which accommodates changes in the magnetic fluid volume due to temperature variations while holding the fluid within the magnetic field to maintain the seal. The pole piece which forms the gap has a straight annular face located at a constant radial distance from the shaft axis. At high operating temperatures expansion of the magnetic fluid causes the fluid to fill the taper of the shaft, but, since the shaft is stationary, fluid spash is eliminated. The straight surface of the pole piece controls fluid splash caused by centrifugal force.

21 Claims, 13 Drawing Figures

FERROFLUID SEAL FOR A STATIONARY SHAFT AND A ROTATING HUB

This invention relates to ferrofluid seals for bearings and spindles which are constructed with a stationary shaft and a rotating hub.

Lubricating fluids are often retained in conventional fluid-film and ball bearings by means of either mechanical or ferrofluid seals. A ferrofluid seal generally consists of a magnet and pole pieces which, together with the bearing shaft (which comprises magnetic material), form a complete magnetic circuit. The circuit includes a small gap between the pole pieces and the bearing shaft in which an intense magnetic field is produced by the magnet. This field traps a magnetic fluid (a low-vapor pressure fluid containing colloidal magnetic particles) and retains it in position in the gap. The magnetic fluid bridges the gap and forms a physical barrier which prevents lubricant loss from the bearing.

A properly-designed ferrofluid seal can retain the magnetic fluid in position and, thus, maintain the seal over a variety of operating temperatures. However, one problem with conventional ferrofluid seals is caused by changes in the volume of the ferrofluid in the seal gap due to temperature variations. Such a problem is particularly acute in fluid-film bearings in which the ferrofluid is also used as the internal film lubricant. In this latter type of bearing, the large amount of magnetic lubricating fluid retained in the bearing is subject to substantial volume changes caused by temperature fluctuations.

More particularly, in fluid film bearings, an increase in bearing temperature causes the magnetic lubricating fluid to expand. Since the bearing is generally sealed, fluid expansion tends to force portions of the fluid through the magnetic field in the seal gap. At high operating temperatures, the fluid can expand sufficiently to force portions of the fluid past the gap area and outside the magnetic field zone. When the fluid has been pushed out of the field zone it becomes essentially free and, when the bearing is rotating, drops of fluid splash out of the seal, in turn, causing fluid loss, contamination and the eventual failure of the bearing.

Conventionally, to prevent fluid loss due to fluid expansion in rotating-shaft fluid-film bearing spindles, the inside surface of the gap-forming pole piece is tapered or chamfered to increase the radial width of the gap towards the exterior face of the seal. This chamfering converts the annular gap into a wedge-shaped annular gap which increases in volume towards the exterior of the seal. The increase in volume in the gap allows for fluid expansion due to temperature increase and accommodates the excess fluid volume while still maintaining the fluid subject to the magnetic field, thereby preventing fluid splash and leakage.

A ferrofluid seal with a chamfered pole piece produces generally satisfactory results in bearing configurations in which the bearing housing or hub is stationary and the bearing shaft rotates. When the prior art chamfered pole face design is applied to bearing configurations in which the shaft is stationary and the bearing hub rotates, the configuration is generally limited to a low operating temperature and low hub rotational speeds. This is because at high operating temperatures and at high rotational speeds, expansion of the ferrofluid forces portions of the fluid into the gap as with the rotating shaft construction—as the fluid moves into the gap it moves radially outward because the gap expands in that direction. However, since the housing is now rotating, it carries the adjacent fluid along with it, and the fluid at the outer edge of the gap is subject to centrifugal force. This force causes further outward movement of the fluid into the gap, which causes the fluid in the seal gap to creep up the sloping face of the gap-forming pole.

The creeping problem is further compounded by a weakening of the local magnetic field strength at the outer positions due to increasing gap width. Eventually, drops of the fluid splash over the edge of the pole piece causing fluid loss and eventual bearing failure.

Accordingly, it is an object of the present invention to provide a ferrofluid seal for a bearing application having a stationary shaft and a rotating hub, which seal is capable of operation over a wide operating temperature range.

It is another object of the present invention to provide a ferrofluid seal for a bearing application with a stationary shaft and a rotating hub which can operate at high rotational speeds.

It is still another object of the present invention to provide a ferrofluid seal for a bearing application with a stationary shaft and a rotating hub, in which the ferrofluid seal has a shaft and pole piece arrangement that allows for expansion and contraction of the ferrofluid due to temperature variations.

The foregoing problems are solved and the foregoing objects are achieved in one illustrative embodiment of the invention in which the surface of the bearing shaft at the ferrofluid seal gap location is tapered to accommodate the change in fluid volume due to temperature variations. The inside surface of the gap-forming pole piece is straight and located at a constant radial distance from the shaft axis.

Thus, although the shaft and the pole piece form a wedge-shaped annular gap into which the ferrofluid can expand at high operating temperatures, the expansion produces movement of the fluid in the gap towards the axis of rotation rather than away from the axis of rotation. This movement is counteracted by centrifugal force acting on the fluid. Although the centrifugal force is a maximum at the outer edge of the gap, the fluid is retained even under high rotational speeds, because the pole piece which defines the outer gap edge has straight walls, making it difficult for the fluid to creep over the edge of the pole piece.

Alternative embodiments of the invention use dual tapers on the bearing shaft in the gap area to accommodate both fluid expansion and fluid contraction. Alternatively, to accommodate both expansion and contraction, the shaft may be tapered to accommodate fluid expansion, and the pole face or magnet may be chamfered on the interior portion of its inner surface to provide for fluid contraction. In all of the embodiments, the inner surface of the gap-forming pole piece is straight, to maintain the ferrofluid in place under high temperatures and rotational speeds.

Figure 1:
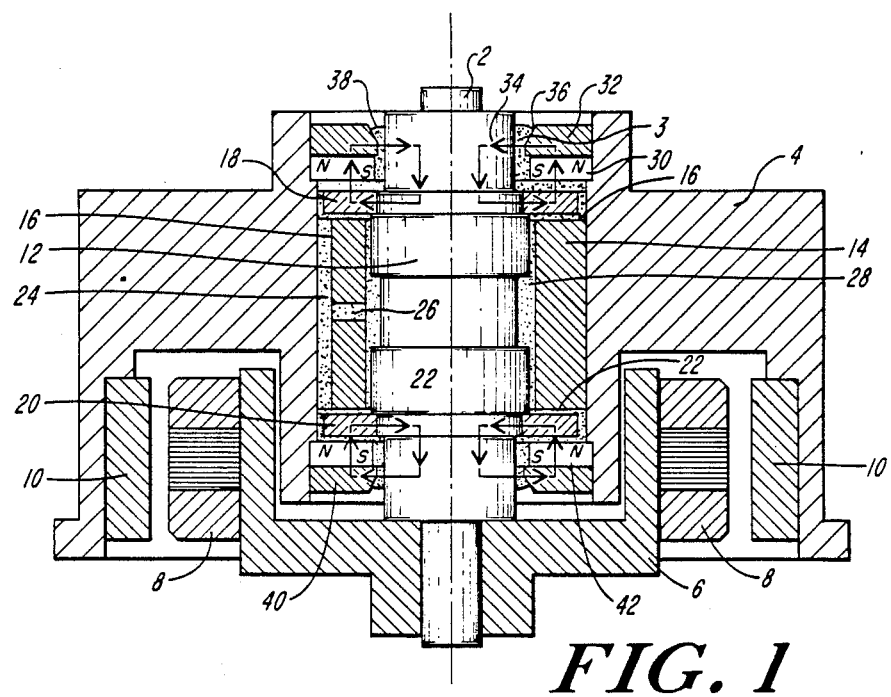
FIG. 1 is a cross-sectional view of a magnetic fluid-film bearing with a stationary shaft and rotating hub in which the fluid is confined by a conventional ferrofluid seal.

FIG. 1 shows a cross-sectional diagram of a conventional magnetic fluid film radial/thrust bearing used in a stationary shaft and rotating hub design. The radial/thrust bearing construction is well-known and is described in detail in copending U.S. patent application Ser. No. 545,875, filed Oct. 27, 1983 by Phillip Stahl, Donald F. Wilcox and Dudley D. F. Fuller and entitled FERROFLUID BEARING AND SEAL APPARATUS which was abandoned and filed in continuation application Ser. No. 833,841 which disclosure is hereby incorporated by reference. In the aforementioned patent, the bearing is used in a bearing design with a rotating shaft and a stationary hub, however, the construction details of the bearing itself are equivalent.

In FIG. 1, the bearing consists of a fluid-film bearing with a stationary shaft 2 and rotating hub or rotor 4. Such a bearing may for example be used as the spindle bearing in a small electric motor which comprises rotor 4 and stator 6. Rotor 4 is driven by the interaction of armature coils 8 and permanent magnets 10 in a conventional fashion. The operation of the motor is not important for an understanding of the invention and, accordingly, will not be described further herein.

Shaft 2 comprises a magnetic material such as steel and is either machined to provide two film bearing surfaces 12 or a separate piece is press fit onto shaft 2 to provide surfaces 12. Surfaces 12 form two fluid film bearings with cylindrical sleeve 14, which provide for radial alignment of the rotor 4. Sleeve 14 is formed of a non-magnetic bearing material such as bronze and does not actually contact bearing surfaces 12, but instead is separated by a thin film of lubricant.

Axial alignment of rotor 4 is controlled by a pair of thrust bearings affixed to the shaft on both sides of sleeve 14. The upper thrust bearing is constructed from an annular thrust bearing ring 18 which is affixed to shaft 2 and operates against the upper face 16 of sleeve 14. Similarly, the lower thrust bearing comprises thrust bearing ring 20 which operates against the lower face 22 of sleeve 14. Thrust bearing rings 18 and 20 are usually made of magnetic steel.

The space 28 between shaft 2 and the inner surface of sleeve 14 is filled with a conventional lubricating ferrofluid, 38, which serves to lubricate the film bearing surfaces between surfaces 12 and sleeve 14 and thrust bearing rings 18 and 20 and sleeve 14. A reserve of ferrofluid is kept in reservoir 24 which communicates with annular space 28 by means of orifice 26.

The ferrolubricant is retained in the bearing by means of two ferrofluid seals located at either end of the bearing. Each of these seals comprises a magnet and an associated pole piece. For example, the ferrofluid seal at the upper end of shaft 2 comprises an annular magnet 30 which is axially-polarized. The magnet is adjacent to annular pole piece 32 which comprises magnetic material. Magnet 30 and pole piece 32, together with shaft 2 and thrust bearing ring 18, form a magnetic circuit which substantially confines the magnetic flux generated by magnet 30 to a path shown diagrammatically by arrows 34. The magnet circuit includes a gap 3 between pole piece 32 and shaft 2. As is well known, the concentration of the magnetic field in gap 3 confines ferrofluid 38 in the gap and prevents leakage of the fluid out of the bearing.

A similar ferrofluid seal is formed from annular magnet 42 and pole piece 40 at the lower end of the bearing assembly.

As previously mentioned, ferrofluid 38 which lubricates the bearing, is subject to expansion and contraction due to temperature variations which occur during the operation of the bearing. To accommodate these fluctuations, the inner surface of pole piece 32 is typically chamfered away from the shaft to form a sloping face 36. The sloping face converts gap 3 into a wedge-shaped annular gap with a volume that increases in a direction towards the exterior of the bearing. Thus, ferrofluid 38 can expand into this gap and be magnetically held without being forced out of the seal area if internal pressure develops or if the ferrolubricant in the bearing expands.

While such a conventional seal design operates satisfactorily within a limited operating temperature range and at low rotational speeds in a bearing configuration with a rotating hub and stationary shaft, the seal has serious problems at high operating temperatures and high rotational speeds. The cause of this problem is shown diagrammatically in FIGS. 2A–2C.

Figure 2A:
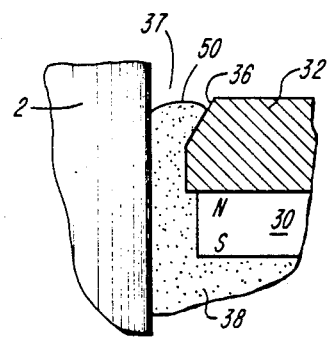
FIGS. 2A, 2B and 2C are expanded cross-sectional diagrams showing deformation of the magnetic fluid meniscus in the seal area of a stationary shaft design under increasing rotational speeds.

More particularly, FIG. 2A is an expanded cross-sectional diagram of shaft 2, pole piece 32 and magnet 30 in the vicinity of the gap 3. FIG. 2A shows that ferrofluid 38, under moderate temperature and low rotational speeds, forms a meniscus 50 as it expands into the wedge-shaped portion of the gap 3. Increased expansion causes the fluid to move outward and up the sloping face 36 of pole piece 32.

Figure 2B:
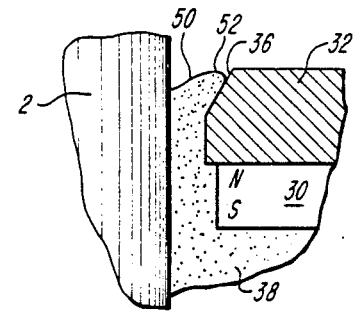
Figure 2C:
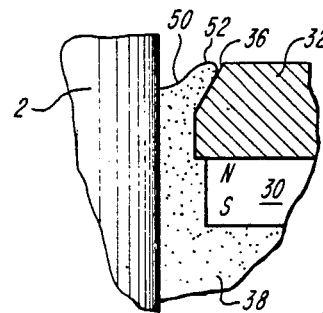

However, as the rotational speed of the rotating hub 4 increases as shown in FIG. 2B, centrifugal force distorts meniscus 50 producing a bulge 52 at the outer edge of the gap. As the rotational speed further increases as shown in FIG. 2C, bulge 52 becomes more pronounced and the fluid creeps up the face 36 of pole piece 32 and moves away from the axis of rotation. As the distance between the outer edge of the ferrofluid and the axis of rotation increases, the centrifugal force (which is proportional to the distance from the axis of rotation) increases, thereby causing further creeping. The creeping problem is further exacerbated by the fact that as the bulge creeps up face 36 of the pole piece 32, the local magnetic field weakens due to the widening gap between the pole piece face and the shaft. Eventually, a drop of ferrofluid shears off the main mass and escapes from the seal. In this manner, a continual loss of ferrofluid will cause the bearing to fail.

Figure 3:
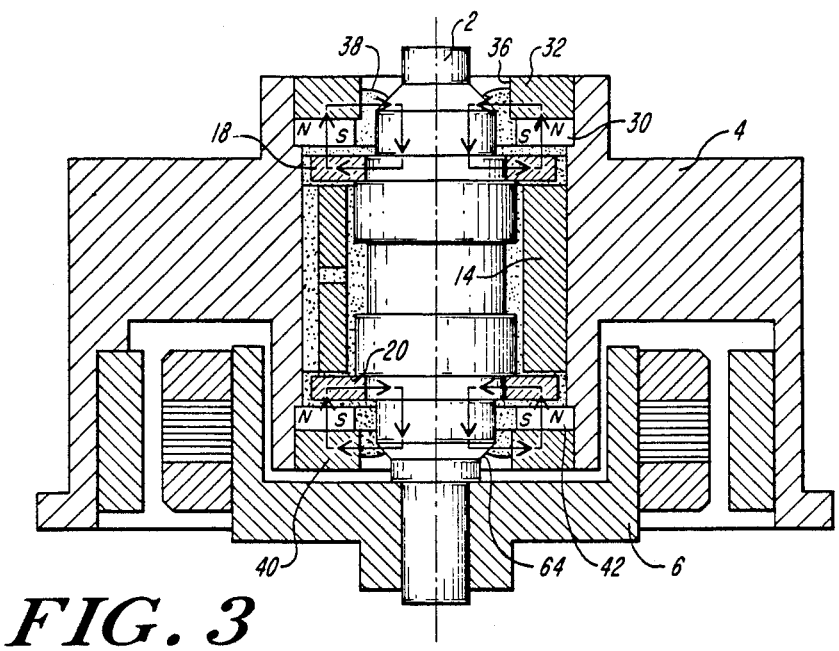
FIG. 3 shows a cross-sectional diagram of a magnetic fluid-film bearing incorporating the inventive seal design.

FIG. 3 shows a motor application identical to that shown in FIG. 1 (a stationary shaft and rotating hub) in which the ferrofluid seals have been constructed in accordance with the present invention to extend the operating range of the magnetic fluid-film bearing. In FIG. 3 components that are identical to those shown in FIG. 1 have been given identical numeral designations. The main bearing assembly is identical to that shown in FIG. 1. The ferrofluid seals, however, have been modified to eliminate ferrofluid splash.

In particular, the inner surface 36 of pole piece 32 is not chamfered as in the prior art design. Instead the inner surface is "straight" and located at a constant radius from the centerline of shaft 2. In addition, shaft 2 now has a tapered portion 60 which, together with the inner surface 36 of pole piece 32, forms a wedge-shaped annular gap which allows for expansion of ferrofluid 38 as in the prior art design.

However, the gap volume increases towards the axis of rotation and the inward radial movement of the fluid due to thermal expansion is now in an opposite direction to the movement produced by centrifugal force. Thus, expansion tends to move the fluid towards the axis of rotation while centrifugal force tends to move the fluid away from the axis of rotation. At the outer edge of the fluid gap where the centrifugal force is at a maximum, the inner surface 36 of pole piece 32 is essentially vertical and the creeping of the fluid along a sloping face is eliminated. Thus, ferrofluid splash is eliminated even at high operating temperatures.

Shaft 2 is similarly tapered at its lower end 64 in order to allow for expansion of the ferrofluid in the lower ferrofluid seal.

Figure 4:
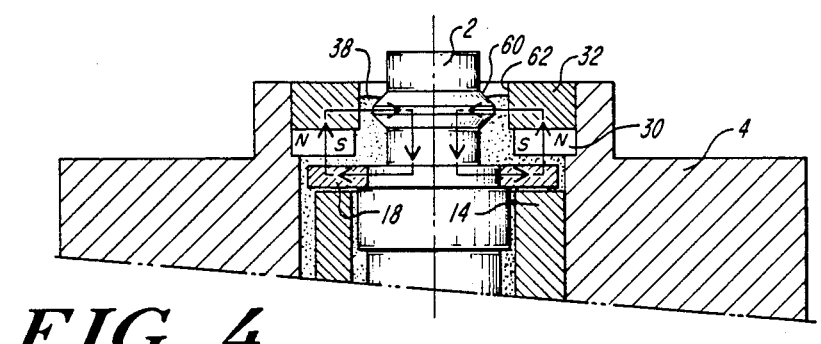
FIG. 4 is a cross sectional diagram of a magnetic fluid-film bearing with an inventive ferrofluid seal incorporating a dual taper on the stationary shaft to accommodate both expansion and contraction of the magnetic fluid.

FIG. 4 is a partial cross-sectional diagram of the motor and bearing assembly shown in FIGS. 1 and 3. The ferrofluid seal shown in FIG. 4, however, has been modified to include a dual taper at surfaces 60 and 62 of shaft 2. This second illustrative embodiment accommodates both expansion and contraction of the ferrofluid 38.

More particularly, in a conventional straight-walled gap design, contraction of ferrofluid 38 within the bearing can reduce the volume of the ferrofluid sufficiently that the ferrofluid is drawn out of the seal gap area and away from the influence of the magnetic field. Once the ferrofluid is no longer entrapped by the magnetic field, the seal is no longer effective as an exclusion seal, and air and other contaminants may enter and become entrained in the ferrolubricant, causing eventual bearing failure.

However, the inner tapering surface, 62, as shown in FIG. 4, creates an inward-facing, wedge-shaped gap which accommodates contraction of the ferrofluid while still retaining it in the influence of the magnetic field. Thus, as the ferrofluid contracts, the gap volume increases, thus accommodating larger volume changes without allowing the ferrofluid outside the magnetic field area.

Figure 5:
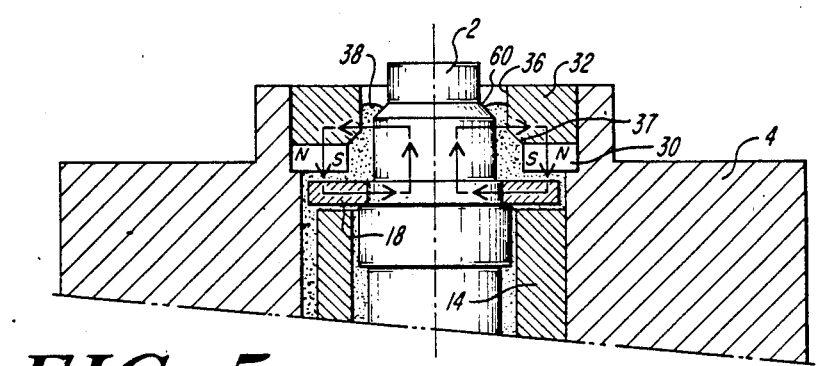
FIG. 5 is a cross-sectional diagram of a magnetic fluid-film bearing incorporating a ferrofluid seal with a taper on the shaft and a chamfer on the inside face of the gap-forming pole piece to accommodate both expansion and contraction of the magnetic fluid.

FIG. 5 shows a partial cross-sectional diagram of an additional illustrative embodiment which accommodates both expansion and contraction of ferrofluid 38. As shown in FIG. 5, shaft 2 has been tapered at surface 60 in order to accommodate expansion of ferrofluid 38 as in the previous embodiments. To accommodate contraction of ferrofluid 38, however, surface 36 of pole piece 32 has been chamfered at its interior surface edge 37 to provide the second wedge-shaped annular gap that allows for contraction of the ferrofluid.

Figure 6:
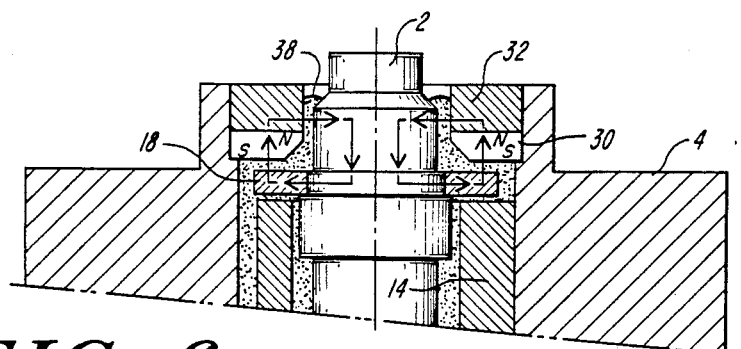
FIG. 6 is a cross-sectional diagram of a magnetic fluid-film bearing incorporating a ferrofluid seal which is a variation of the seal shown in FIG. 5, which seal utilizes a taper on the stationary shaft and a chamfered face on the seal magnet to accommodate both expansion and contraction of the magnetic fluid.

FIG. 6 shows an a cross section of another illustrative embodiment which is a modification of the arrangement shown in FIG. 5. In FIG. 6, a wedge-shaped gap to accommodate contraction of the ferrofluid is formed by chamfering the lower face of magnet 30 instead of the lower face of pole piece 32 as shown in FIG. 5.

Figure 7:
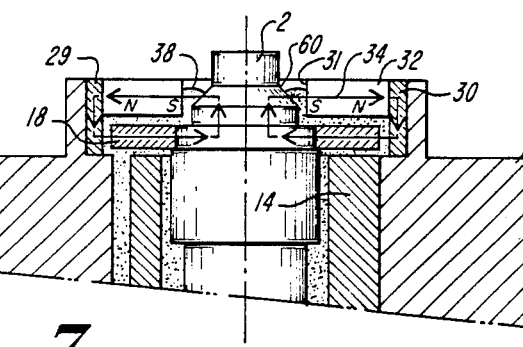
FIG. 7 is a cross-sectional diagram of a magnetic fluid-film bearing incorporating a ferrofluid seal with a radially-polarized magnet and a taper on the shaft to accommodate expansion and contraction of the magnetic fluid.

FIG. 7 is a partial cross-sectional diagram which shows a tapered shaft 2 used with a radially-polarized magnet 30 which configuration eliminates the pole piece. A wedge-shaped annular gap is now formed between taper 60 of shaft 2 and the inner face 31 of magnet 30. In order to form a complete magnetic circuit (as shown by arrows 34), an additional magnetic sleeve 29 is used with this embodiment because housing 4 is non-magnetic.

Figure 8:
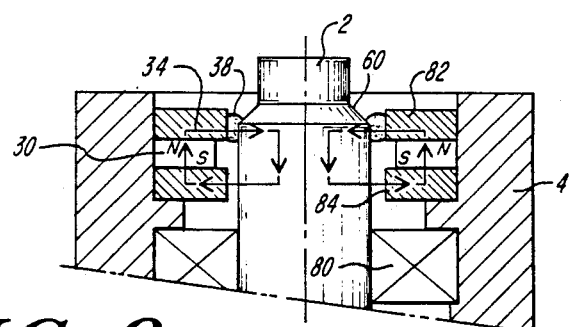
FIG. 8 is a cross-sectional diagram of the inventive seal incorporated in a bearing application with a stationary spindle and rotating hub and utilizing ball bearings.
Figure 9:
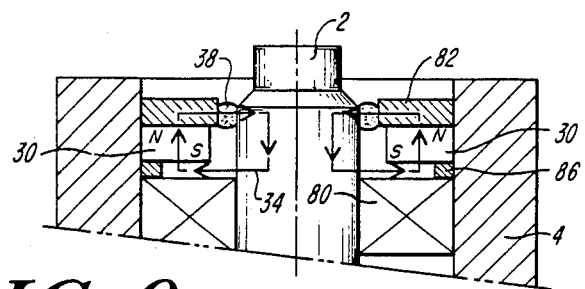
FIG. 9 is a cross-sectional diagram of a ferrofluid seal for use in a ball-bearing spindle with a single pole piece.
Figure 10:
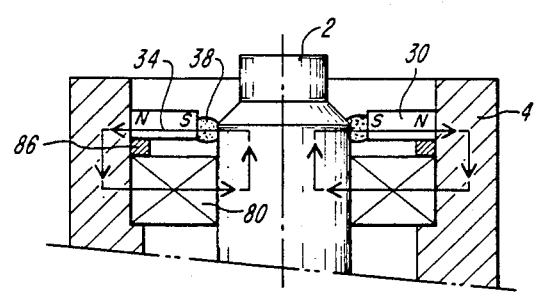
FIG. 10 is a cross-sectional diagram of a ferrofluid seal for use in a ball-bearing spindle with a radially-polarized magnet.

FIGS. 8, 9 and 10 show illustrative embodiments of ball-bearing spindles that incorporate the inventive ferrofluid seal principles. In particular, in FIG. 8, shaft 2 is supported by a ball bearing, shown schematically as bearing 80, rather than by a magnetic fluid-film bearing as discussed with the previous embodiments. Bearing 80 may be lubricated with conventional lubricants and is sealed by means of a ferrofluid seal consisting of pole pieces 82 and 84, magnet 30 and ferrofluid 38. A magnetic circuit (illustrated by arrows 34) is completed through pole piece 82, magnet 30, pole piece 84 and shaft 2. The magnetic field concentrated in gap 3 between pole piece 82 and shaft 2 traps an annular bead of ferrofluid 38 which forms a magnetic fluid seal. Shaft 2 comprises magnetic material and has been tapered at face 60 in order to form a wedge-shaped gap which allows for an additional fluid storage region in the seal area so that more fluid can be retained in the seal for longer life and reliability.

FIG. 9 shows a similar design in which a single pole piece 82 is used to form the ferrofluid seal, the magnetic path (as shown by arrows 34) now being completed through bearing 80 instead of a second pole piece. In FIG. 9, shaft 2 is comprised of a magnetic material.

FIG. 10 shows still another embodiment which uses a radially-polarized magnet 30 that eliminates both pole pieces 32 and 80. The magnetic circuit, as shown by arrows 34, is completed through magnet 30, ball bearing 80 and magnetic housing 4, and ring 86 which comprises non-magnetic material.

Figure 11:
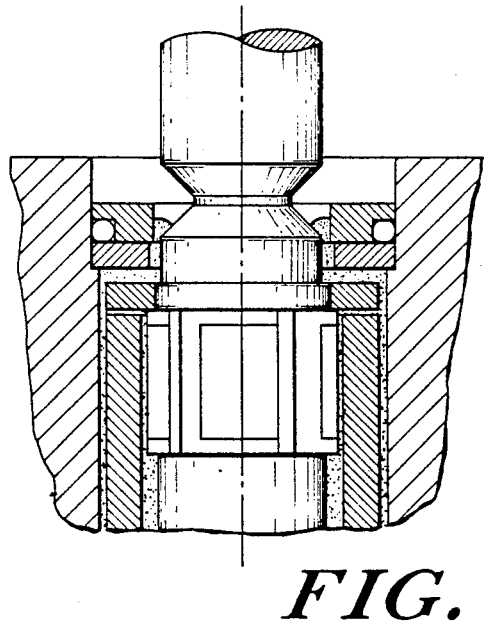
FIG. 11 is a cross-sectional diagram of an additional embodiment of magnetic fluid film bearing incorporating a ferrofluid seal with a double taper on the shaft to maximize shaft stiffness.

FIG. 11 discloses another embodiment of a magnetic fluid film bearing which uses a taper, 60, to accommodate expansion of the ferrofluid as set forth in the previous designs. However, a second taper 62 located immediatley above taper 60 brings shaft 2 back to its original diameter. The double taper increases the external diameter of the shaft which provides for maximum stiffness of the shaft outside the bearing area. This seal design may be used in either or both of the upper or lower bearing in bearing designs such as that shown in FIG. 3.

What is claimed is:

1. In a bearing application having a stationary shaft about which a hub rotates, a ferrofluid seal for isolating said bearing from from an external environment, said seal comprising a magnet, means for forming a magnetic circuit including said magnet, said shaft and at least one annular gap between a portion of said magnetic circuit and said shaft, said gap being filled with ferrofluid, the improvement comprising, a taper on said shaft forming a portion of said gap into a first annular wedge-shaped gap having a sloping wall which extends radially towards the axis of said shaft and in a direction towards said external environment.

2. In a bearing application according to claim 1 having a stationary shaft about which a hub rotates, wherein said ferrofluid seal has at least one pole piece with an annular inner surface forming a gap with said shaft, said gap being filled with ferrofluid, the improvement according to claim 1 wherein said inner surface of said pole piece is straight and at a constant radial distance from the axis of rotation of said shaft.

3. In a bearing application according to claim 1 having a stationary shaft about which a hub rotates, the improvement according to claim 1 wherein said shaft has a second tapered portion forming a second wedge-shaped gap located adjacent to said first wedge-shaped gap and having a sloping wall which extends radially towards the axis of said shaft and in a direction away from said external environment to accommodate contraction of said ferrofluid.

4. In a bearing application according to claim 1 having a stationary shaft about which a hub rotates, wherein said ferrofluid seal has at least one pole piece with an annular inner surface forming a gap with said shaft, said gap being filled with ferrofluid, the improvement according to claim 1 wherein a portion of said inner surface of said pole piece is straight and at a constant radial distance from the axis of rotation of said shaft and a portion of said pole piece facing away from said external environment is chamfered to form a second wedge-shaped gap located adjacent to said first wedge-shaped gap and having a sloping wall which extends radially away from the axis of said shaft and in a direction away from said external environment to accommodate contraction of said ferrofluid.

5. In a bearing application according to claim 1 having a stationary shaft about which a hub rotates, wherein said ferrofluid seal has at least one pole piece with an annular inner surface forming a gap with said shaft, said gap being filled with ferrofluid and a magnet located adjacent to said pole piece on the side away from said external environment, the improvement according to claim 1 wherein a portion of said inner surface of said magnet is straight and at a constant radial distance from the axis of rotation of said shaft and a portion of said magnet facing away from said external environment is chamfered to form a second wedge-shaped gap having a sloping wall which extends radially away from the axis of said shaft and in a direction away from said external environment to accommodate contraction of said ferrofluid.

6. A bearing for use in an application having a stationary shaft about which a hub rotates, said bearing comprising, a tapered shaft, first bearing means for maintaining radial alignment of said shaft relative to said hub, second bearing means for limiting axial alignment of said shaft relative to said hub, and a ferrofluid seal for isolating said bearing from an external environment, said seal comprising a magnet, means for forming a magnetic circuit including said magnet, said shaft and at least one annular gap between a portion of said magnetic circuit and said shaft, said gap being filled with ferrofluid, the taper on said shaft forming a portion of said gap into a first annular wedge-shaped gap having a sloping wall which extends radially towards the axis of said shaft and in a direction towards said external environment.

7. A bearing according to claim 6 wherein said first bearing means is a magnetic fluid film sleeve bearing.

8. A bearing according to claim 6 wherein said first bearing means is a magnetic fluid film thrust bearing.

9. A bearing according to claim 6 wherein said first bearing means is a ball bearing.

10. A bearing according to claim 6 wherein said ferrofluid seal has at least one pole piece with an annular inner surface forming a gap with said shaft, said gap being filled with ferrofluid, and wherein said inner surface of said pole piece is straight and at a constant radial distance from the axis of rotation of said shaft.

11. A bearing according to claim 6 wherein said shaft has a second tapered portion forming a second wedge-shaped gap located adjacent to said first wedge-shaped gap and having a sloping wall which extends radially towards the axis of said shaft and in a direction away from said external environment to accommodate contraction of said ferrofluid.

12. A bearing according to claim 6 wherein said ferrofluid seal has at least one pole piece with an annular inner surface forming a gap with said shaft, said gap being filled with ferrofluid, and wherein a portion of said inner surface of said pole piece is straight and at a constant radial distance from the axis of rotation of said shaft and a portion of said pole piece facing away from said external environment is chamfered to form a second wedge-shaped gap located adjacent to said first wedge-shaped gap and having a sloping wall which extends radially away from the axis of said shaft and in a direction away from said external environment to accommodate contraction of said ferrofluid.

13. A bearing according to claim 6, wherein said ferrofluid seal has at least one pole piece with an annular inner surface forming a gap with said shaft, said gap being filled with ferrofluid and a magnet located adjacent to said pole piece on the side away from said external environment, and wherein a portion of said inner surface of said magnet is straight and at a constant radial distance from the axis of rotation of said shaft and a portion of said magnet facing away from said external environment is chamfered to form a second wedge-shaped gap having a sloping wall which extends radially away from the axis of said shaft and in a direction away from said external environment to accommodate contraction of said ferrofluid.

14. A bearing according to claim 6, wherein said magnet is radially-polarized.

15. An electric motor comprising, a stationary, tapered shaft, a rotor mounted for rotation about said shaft, a stator mounted on said shaft, electrical means for generating relative movement between said rotor and said stator, a magnetic fluid film sleeve bearing for maintaining radial alignment of said shaft relative to said rotor, a magnetic fluid film thrust bearing for limiting axial alignment of said shaft relative to said rotor, a pair of ferrofluid seals for isolating said bearing from an external environment, each of said seals comprising a magnet, means for forming a complete magnetic circuit including said magnet, said shaft and at least one annular gap between a portion of said magnetic circuit and said shaft, said gap being filled with ferrofluid, the taper on said shaft forming a portion of said gap into a first annular wedge-shaped gap having a sloping wall which extends radially towards the axis of said shaft and in a direction towards said external environment.

16. A motor according to claim 15 wherein said ferrofluid seal has at least one pole piece with an annular inner surface forming a gap with said shaft, said gap being filled with ferrofluid, and wherein said inner surface of said pole piece is straight and at a constant radial distance from the axis of rotation of said shaft.

17. A motor according to claim 16 wherein said shaft has a second tapered portion forming a second wedge-shaped gap located adjacent to said first wedge-shaped gap and having a sloping wall which extends radially towards the axis of said shaft and in a direction away from said external environment to accommodate contraction of said ferrofluid.

18. A motor according to claim 16 wherein said ferrofluid seal has at least one pole piece with an annular inner surface forming a gap with said shaft, said gap being filled with ferrofluid, and wherein a portion of said inner surface of said pole piece is straight and at a constant radial distance from the axis of rotation of said shaft and a portion of said pole piece facing away from said external environment is chamfered to form a second wedge-shaped gap located adjacent to said first wedge-shaped gap and having a sloping wall which extends radially away from the axis of said shaft and in a direction away from said external environment to accommodate contraction of said ferrofluid.

19. A motor according to claim 18, wherein said ferrofluid seal has at least one pole piece with an annular inner surface forming a gap with said shaft, said gap being filled with ferrofluid and a magnet attached to said pole piece on the side away from said external environment, and wherein a portion of said inner surface of said magnet is straight and at a constant radial distance from the axis of rotation of said shaft and a portion of said magnet facing away from said external environment is chamfered to form a second wedge-shaped gap having a sloping wall which extends radially away from the axis of said shaft and in a direction away from said external environment to accommodate contraction of said ferrofluid.

20. A motor according to claim 16, wherein said magnet is radially-polarized.

21. An electric motor comprising, a stationary, tapered shaft, a rotor mounted for rotation about said shaft, a stator mounted on said shaft, electrical means for generating relative movement between said rotor and said stator, at least one ball bearing for maintaining radial alignment of said shaft relative to said rotor and for limiting axial alignment of said shaft relative to said rotor, a pair of ferrofluid seals for isolating said bearing from an external environment, each of said seals comprising a magnet, means for forming a complete magnetic circuit including said magnet, said shaft and at least one annular gap between a portion of said magnetic circuit and said shaft, said gap being filled with ferrofluid, the taper on said shaft forming a portion of said gap into a first annular wedge-shaped gap having a sloping wall which extends radially towards the axis of said shaft and in a direction towards said external environment.

* * * * *